H. W. FELLOWS.
LIFT MECHANISM FOR PLOWS.
APPLICATION FILED JAN. 24, 1914.
1,188,431.
Patented June 27, 1916.
3 SHEETS—SHEET 1.
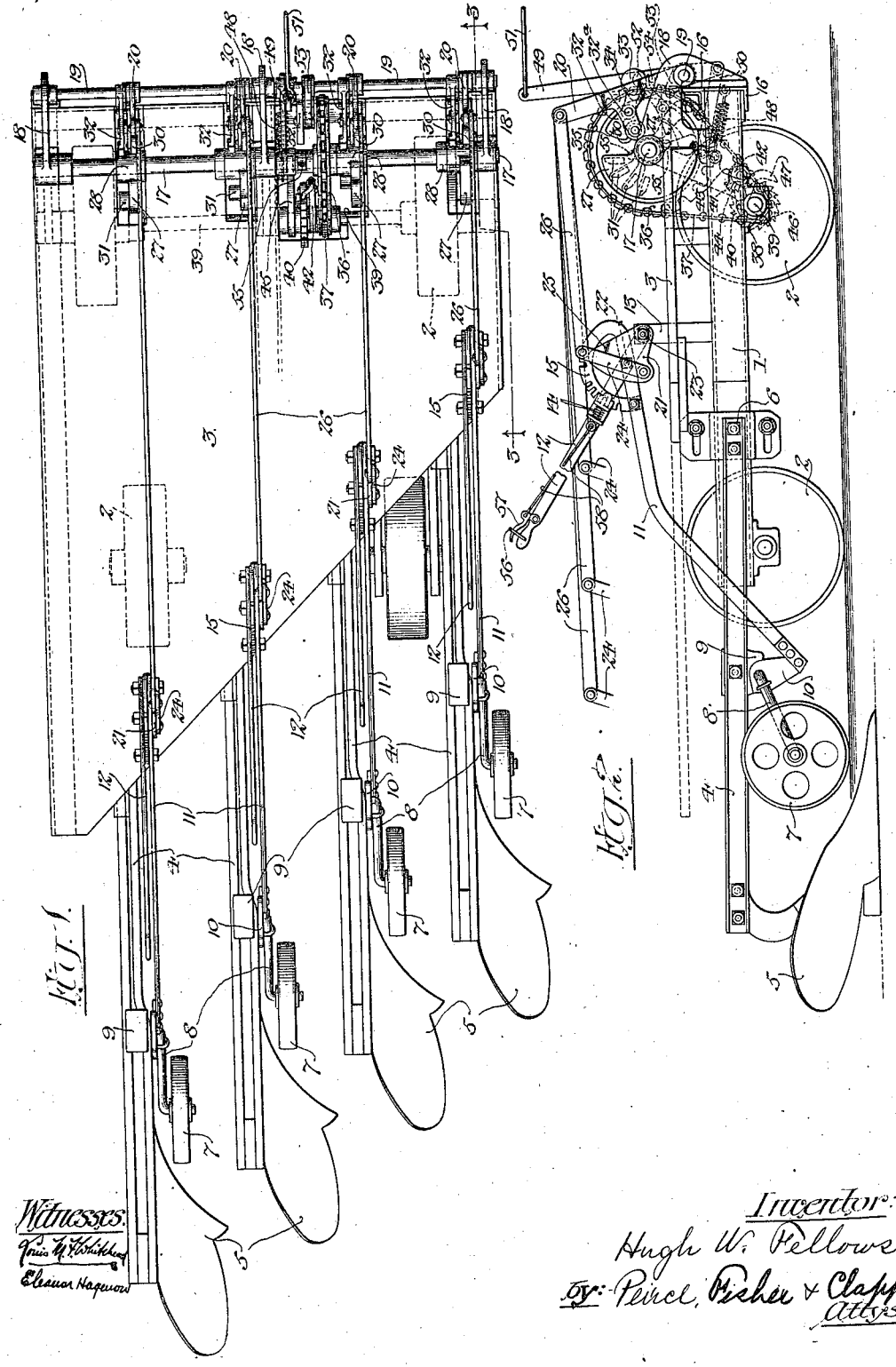
Witnesses
Inventor:
Hugh W. Fellows
by Peirce, Fisher & Clapp
Attys.

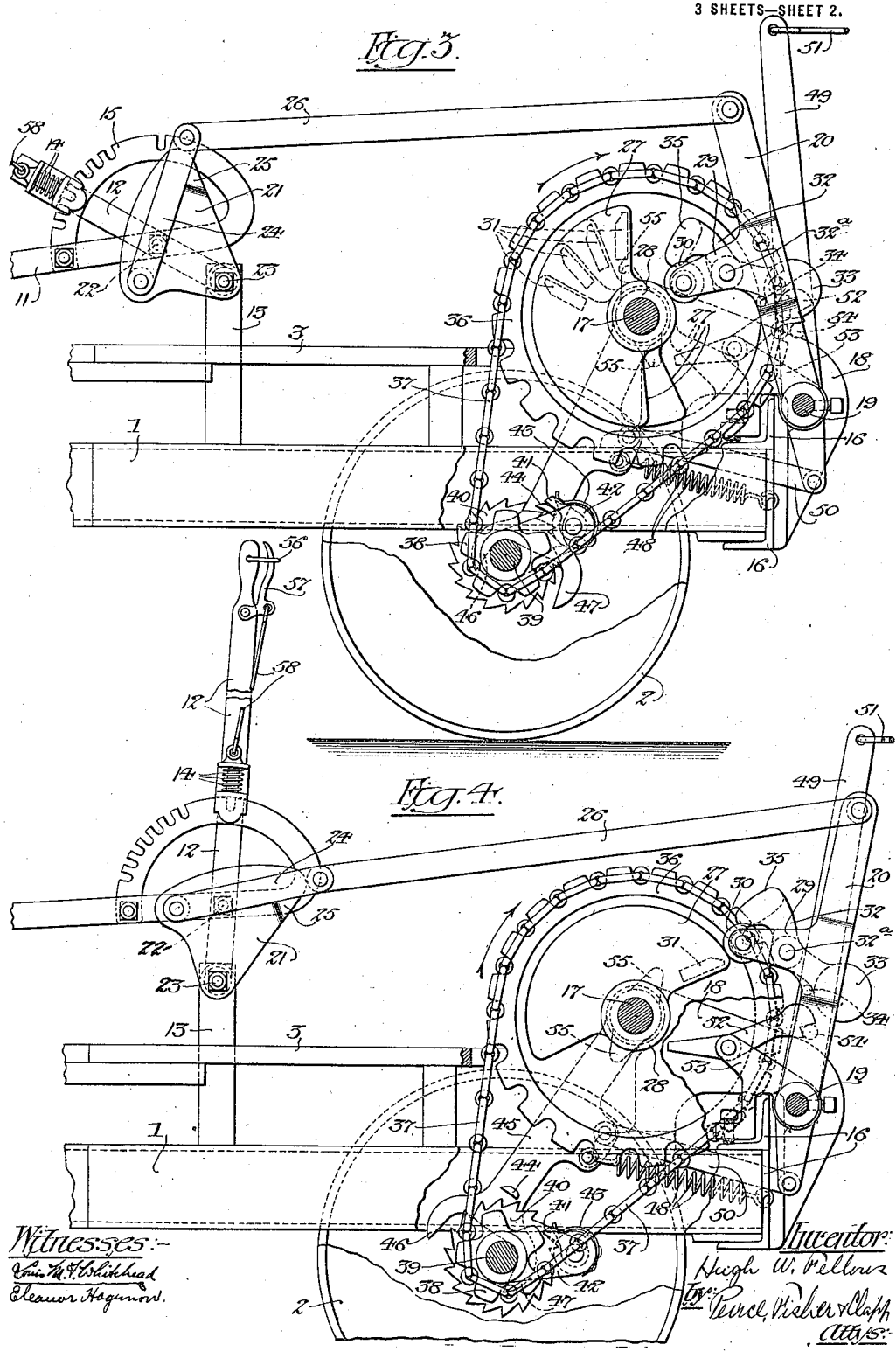

H. W. FELLOWS.
LIFT MECHANISM FOR PLOWS.
APPLICATION FILED JAN. 24, 1914.
1,188,431.
Patented June 27, 1916.
3 SHEETS—SHEET 3.
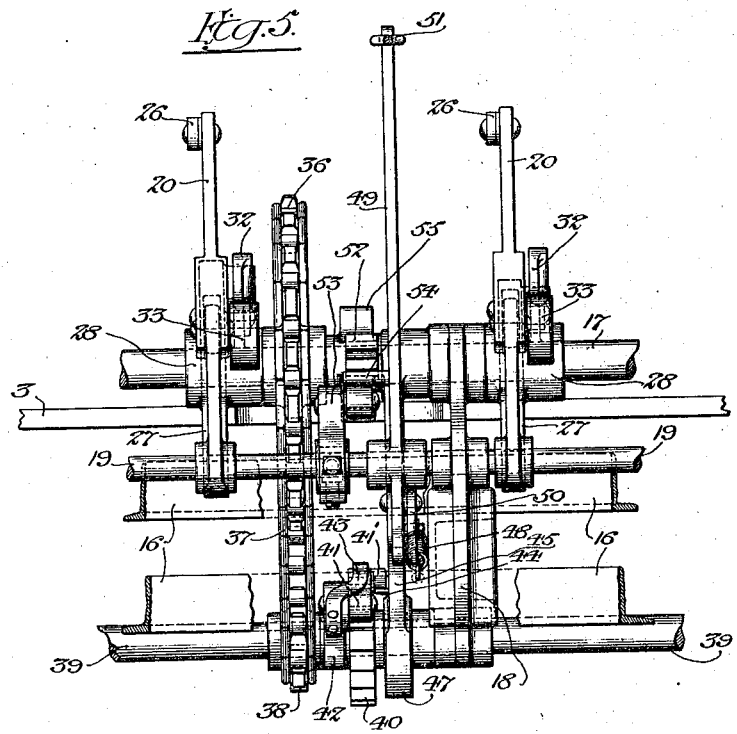
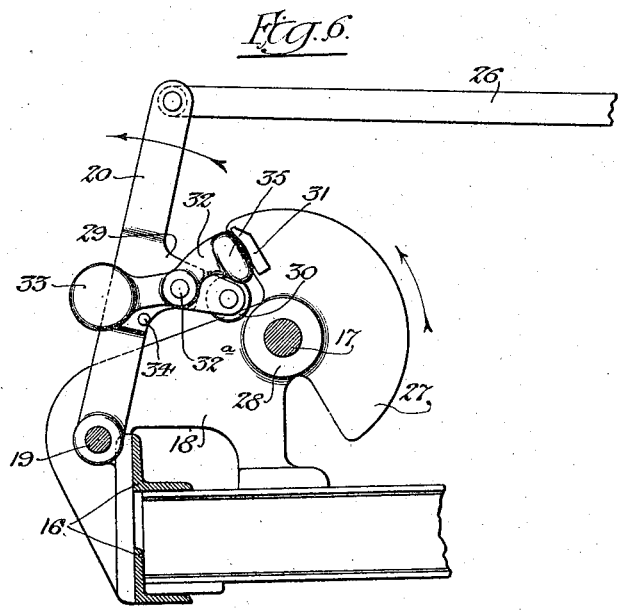

UNITED STATES PATENT OFFICE.

HUGH W. FELLOWS, OF LOS ANGELES, CALIFORNIA, ASSIGNOR TO J. I. CASE THRESH-
ING MACHINE COMPANY, OF RACINE, WISCONSIN, A CORPORATION.

LIFT MECHANISM FOR PLOWS.

1,188,431.   Specification of Letters Patent.   Patented June 27, 1916.

Application filed January 24, 1914. Serial No. 814,220.

*To all whom it may concern:*

Be it known that I, HUGH W. FELLOWS, a citizen of the United States, and a resident of Los Angeles, county of Los Angeles, and State of California, have invented certain new and useful Improvements in Lift Mechanism for Plows, of which the following is a full, clear, and exact description.

The invention relates to lift mechanism for plows and more particularly to power actuated mechanism for raising and lowering the plows of a gang.

The invention seeks to provide simple and effective means by which the plows may be successively raised and lowered, and consists in the features of improvement hereinafter set forth, illustrated in the preferred form in the accompanying drawings, and more particularly pointed out in the appended claims.

In the drawings, Figure 1 is a plan view of a gang plow with the present improvement applied thereto. Fig. 2 is a side elevation, showing one of the plows and the lift mechanism therefor. Figs. 3 and 4 are detailed views in side elevation of the power actuated lift mechanism with the parts shown in different positions. Fig. 5 is a front elevation of parts shown in Fig. 3. Fig. 6 is a detail view of a portion of the lift mechanism in mid-position.

The gang plow illustrated comprises a draft frame 1 supported upon a series of wheels 2 and surmounted by a platform 3. The plow beams 4 carry the plow bodies 5 and are connected at their forward ends by suitable couplings 6, so that the plows may be raised and lowered. Each plow is provided with a gage wheel 7 mounted upon the lower end of an arm 8. The upper end of the gage wheel arm 8 is pivotally mounted in the bracket 9 secured to the plow beam and is provided with a downwardly and forwardly projecting arm 10. Links 11 are pivoted at their rear ends to the arms 10 and are pivoted at their forward ends to a series of shift levers 12. The latter are pivotally mounted at their lower ends upon standards 13 which rise from the draft frame. Each lever is provided, as usual, with a locking door 14 which coöperates with a notched segment formed upon the forward end of the link 11. The parts thus far described may be of any usual or suitable construction.

The longitudinal members of the draft frame 1 in the construction shown are connected at their forward ends by angle bars 16. The lift mechanism is mounted on a transverse shaft 17 which is journaled at its ends in brackets 18 mounted on the side sills and front angle bars of the frame. A transverse supporting shaft 19 is arranged in front of and below the shaft 17 and is fixed at its ends to the brackets 18. A series of shifter arms 20 are pivotally mounted at their lower ends upon the supporting shaft 19 and are connected at their upper ends to the individual plows of the gang.

In the construction shown, a triangular plate 21 is secured to the lower end of each shift lever 12 by means of bolts 22 and 23. These bolts rigidly secure the plate 21 to the lever, but the bolt 22 also forms the pivotal connection between the lever and the link 11, and the bolt 23 forms the pivotal connection between the lever and the standard 13. A short link 24 is pivoted at its rear end to one side of the plate 21 and its forward end engages a laterally projecting lug 25 on the opposite side of the plate. A second link 26 connects the forward end of the short link 24 to the upper end of the corresponding shifter arm 20. By moving the shifter arms 20 from the position shown in Figs. 1 and 3, forwardly to the position shown in Fig. 4, the plows are raised through the medium of the connections described, and by moving the shifter arms rearwardly from the position shown in Fig. 4 to that shown in Figs. 2 and 3, the plows are lowered by gravity to working position. The jointed connections between the shifter arms 20 and the hand levers 12 formed by the links 24 and 26, is such, that, when the plows are lowered, the hand levers may be used to raise and lower the plows independently of the power actuated mechanism that controls the movement of the shift levers 20. The shifter arms 20, of course, correspond in number to the number of plows in the gang and the shaft 17 is provided with a corresponding number of segmental plates 27 having hubs 28. Each shift lever is provided with an offset projection 29 carrying a roller 30 which is arranged to engage the edge of the segmental plate 27 and the periphery of its hub 28. When the edge of the segmental plate 27 engages the roller 30, as shown in Fig. 4, the plow is held in raised position, and when the roller rests upon the hub 28 of the plate, as shown in Figs. 2 and 3, the plow is in its lowered or working position.

To raise the plow, each segmental plate is provided with an offset lug or abutment 31 which is arranged to coöperate with an abutment arm 32 which is pivoted intermediate its ends upon the offset 29 of the corresponding shifter arm 20. The forward end portion 33 of the arm 32 is enlarged or weighted, so that the pivoted abutment arm is normally held in engagement with the stop pin 34 on the shifter arm. The abutment arm is provided with a rounded rear end portion 35 which coöperates with the abutment or lug 31 on the segment plate 27. To move the shifter arm to raise the plow, a half revolution is imparted to the shaft 17 and the segment plates 27 thereon. As each segment plate is rotated in the direction indicated by the arrows in Figs. 3 and 6, the lug or abutment 31 is brought into engagement with the rounded rear end 35 of the abutment arm 32 and the shifter arm is forced forwardly to lift the plow by the direct thrust of the lug 31 upon the end of the arm 32. During this movement, the roller 30 upon the projection 29 is held out of engagement with the segment plate, as shown in Fig. 6, and the abutment 32 rocks slightly upon its pivot. During this movement also, the rounded end 35 of the abutment arm rolls to a slight extent upon the surface of the lug 31. When the plow is raised, the periphery of the segment plate engages the roller 30 to hold the plow in raised position, while the continued movement of the shaft 17 and plate 27 disengages the lug 31 from the end of the abutment arm. The weighted end of the latter then returns it to normal position relatively to the shifter arm in engagement with the stop pin 34. After the shaft and segment plates thereon have rotated through a half revolution, the movement thereof is arrested. When these parts are again thrown into operation, the segment plate is disengaged from the roller 30, so that the shifter arm is free to move rearwardly and permit the lowering movement of the plow to working position by gravity. When the plow is in the ground, the roller 30 of the shifter arm normally rests upon the hub 28 of the corresponding segment plate. The segment plates are arranged progressively in angular spaced relation upon the shaft 17 so that the several plows of the gang are successively raised and lowered.

Suitable means are provided for rotating the shaft 17 through a half revolution at each operation. For this purpose, the shaft is provided with a large sprocket wheel 36 which is connected by a chain 37 to a small sprocket wheel 38 on the shaft 39. This shaft is journaled in suitable bearings on the underside of the draft frame and forms the axle of the front carrying wheels thereof. One of the front carrying wheels is fixed to the shaft, so that the latter is continuously rotated during the forward travel of the machine. The sprocket wheel 38 is loose on the shaft, but is adapted to be connected thereto by a suitable clutch mechanism.

In the construction shown, the clutch comprises a ratchet wheel 40 fixed to the shaft 39 and a clutch dog 41 which is pivotally mounted on an arm 42 that is fixed to the sprocket wheel 38. The dog is pressed toward the teeth of the ratchet wheel by a spring 43, but is normally held out of engagement therewith by a lug 44 which is arranged to engage a projection or lug 41' (see Fig. 5) on the clutch dog. The lug 44 is mounted upon a swinging arm 45 which is loosely hung at its upper end upon the shaft 17. The lower end of the arm is provided with a fork, the members 46 and 47 of which are arranged to engage the shaft 39 to limit the movement of the arm. The arm is held in normal position with the lug 46 engaging the shaft 49 by a spring 48 which extends between the arm and the front part of the draft frame. In this position, the lug 44 on the arm is positioned beneath the lug 45 of the clutch dog and holds it in disengaged position.

The arm 45 is shifted to throw the clutch into operation by a lever 49 which is pivotally mounted adjacent its lower end upon the supporting shaft 19. The lower end of this lever is connected by a link 50 to the arm 45. The upper end of the lever 49 can be shifted in any suitable manner to thereby shift the shift arm 45, that controls the clutch, from the position shown in Fig. 3 to that shown in Fig. 4. In this position, the lug 44 releases the clutch dog and the spring 43 throws it into engagement with the ratchet wheel. If desired, a link or cord 51 may be connected to the upper end of the trip controlling lever 49 and extended forwardly therefrom to the traction engine which pulls the plow. When the trip lever 49 is moved forwardly to shift the trip arm 45, it is held in forward position by a latch 52 which is pivotally mounted intermediate its ends on a bracket 53 that is fastened to the front part of the draft frame. This latch is provided with a notched forward end which is arranged to engage a pin 54 on the trip lever 29 when the latter is shifted forwardly to hold it in shifted position, as shown in Fig. 4. The forward end of the latch is weighted and normally rests upon the pin 54, as shown in Fig. 3. When the lever is shifted, the notched forward end of the latch drops into engagement with the pin, and as stated, holds it in shifted position. The tail of the latch is arranged in the path of movement of a pair of lugs 55 mounted upon the shaft 17. These lugs are diametrically opposite each other, so that, after the shaft 17 has rotated through a half revolution, one of the lugs will strike the tail of the latch 52 and release the controlling lever 49 and trip arm 45, so that these parts are restored to normal position by the spring 48 to disengage the clutch dog 44 and arrest the movement of the sprocket wheel 38 and of the shaft 17 driven thereby.

The operation is as follows: When the plows are in the ground, the lift mechanism is in the position shown in Figs. 1, 2 and 3. In this position, as stated, the main levers 12 may be manipulated to raise and lower the plows independently by hand without disturbing the power actuated lift. In this normal position of the parts, as stated, the trip arm is held in position by the spring 48 with the lug 46 thereof against the shaft 39, and in this position, the lug 44 on the trip arm holds the clutch dog 48 out of engagement with the clutch ratchet 40. If the operator desires to raise the plows, he shifts the controlling lever 49 forwardly to thereby move the trip arm 45 rearwardly through the medium of the link 50, and so disengage the lug 44 on the clutch dog. The latter is then thrown into engagement with the ratchet by the spring 43 and the sprocket 38 is thereby connected to the rotating shaft 39 and the shaft 17 and segment plates thereon are advanced in the direction indicated by the arrow in Figs. 3, 4 and 6. When the control lever 49 and trip arm 45 are shifted, they are held in shifted position by the latch 52, as described. In this position, the lug 44 is out of the path of movement of the projection or lug 45 on the clutch dog, so that the clutch remains in engagement until the latch 52 is released by one of the lugs 55 on the shaft 17. In this way, when once the clutch is engaged, it remains in engagement until the shaft 17 and segment plates 27 thereon complete a half revolution. During this half revolution, if the plows are in working position, the abutments 31 on the segment plates will coöperate with the pivoted abutment arms 32 on the shifter arms 20 to successively raise the plows, and the plows will be held in raised position by the engagement of the segment plates with the rollers 30. The plows are thus held in raised position until the shaft 17 is again actuated. When the clutch mechanism is again engaged to rotate the shaft through a half revolution, the segment plates will successively move from engagement with the rollers 30, so that the plows of the gang are lowered one after the other.

It should be noted that the segment plates 27 and the portions of their hubs 28 which coöperate with the rollers 30 of the shifter arms 20 to hold the plows in raised and lowered positions, are substantially semi-circular. This construction permits the arrangement of the segment plates in angular spaced relation on the shaft 17 to successively raise the plows without interfering with their proper operation. The abutment lugs 21 on the segment plates act upon the pivoted abutment arms 32 in line with the pivots 32ª thereof to move the shift levers 20 and raise the plows. This movement is effected with little friction between the coöperating parts. Ordinarily, the locking dog 14 of each hand lever 12 will be held out of operation by a catch 56 pivoted on the upper end of the lever and arranged to engage a pivoted handle 57 that is connected to the dog by a rod 58. If desired, however, the catch 56 may be disengaged and any one of the plows held in raised idle position by means of the dog 14, while the remaining plows of the gang are in use and under control of the power actuated lift mechanism.

It is obvious that numerous changes may be made in the details set forth without departure from the essentials of the invention as defined in the claims.

I claim as my invention:—

1. In a power lift for plows, the combination with a plow, of a shifter arm connected to said plow, an operating shaft, means for imparting one-half revolutions to said shaft, coöperating abutments on said shaft and said arm for shifting the latter to raise the plow, said abutments having a rocking contact and a segment on said shaft coöperating with said shifter arm to hold said plow in raised position, substantially as described.

2. In a power lift for plows, the combination with a plow, of a shifter arm connected to said plow, an operating shaft, means for imparting one-half revolutions to said shaft, and coöperating abutments on said shaft and said arm for shifting the latter to raise the plow, one of said abutments being pivotally mounted, and having a rocking contact with the other abutment substantially as described.

3. In a power lift for plows, the combination with a plow, of a shifter arm connected to said plow, an operating shaft, means for imparting one-half revolutions to said shaft, a rock arm pivotally mounted on said shifter arm, an abutment on said shaft mounted to engage the end of said rock arm to thereby move said shifter arm to raise the plow, and a segment on said shaft coöperating with said shifter arm to hold the plow in raised position and to lower the same, substantially as described.

4. In a power lift for plows, the combination with a plow, of a shifter arm connected to said plow, an operating shaft, means for imparting one-half revolutions to said shaft, a rock arm pivotally mounted on said shifter arm, a stop on said shifter arm against which said pivoted arm normally rests, an eccentric abutment on said shaft arranged to engage said end of said rock arm to thereby move said shifter arm and raise the plow, a roller on said shifter arm, and a segment on said shaft coöperating with said roller to hold the plow in raised position and lower the same, substantially as described.

5. In a power lift for plows, the combination with a plow, of a shifter arm connected to said plow, a power-operated rotary member having high and low portions coöperating with said shifter arm to hold said plow in raised and lowered positions and a rotary power-operated part coöperating with said arm for raising the plow, said part being arranged to move said arm out of engagement with said member as the plow is raised.

6. In a power lift for plows, the combination with a plow, of a shifter arm connected to said plow, an operating shaft, means for imparting half-revolutions to said shaft, a member on said shaft having semicircular high and low portions, a projection on said arm coöperating with said member to hold said plow in raised and lowered positions, a radial abutment on said shaft, an oscillating member mounted on said shifter arm and arranged to be engaged by said abutment to raise the plow.

7. In a power lift for plows, the combination with a plow, of a shifter arm connected to said plow, an operating shaft, means for imparting half-revolutions to said shaft, a member on said shaft having semicircular high and low portions, a roller on said arm coöperating with said member for holding the plow in raised and lowered positions, a radial abutment on said shaft, an oscillating arm mounted on said shifter arm and arranged to be engaged by said abutment to raise the plow, the latter being arranged to move said roller out of engagement with said member as the plow is raised.

HUGH W. FELLOWS.

Witnesses:
J. G. ANDERSON,
HARRY L. CLAPP.